(12) United States Patent
Huang et al.

(10) Patent No.: US 11,709,368 B2
(45) Date of Patent: Jul. 25, 2023

(54) METHOD FOR ADJUSTING FIELD OF VIEW ANGLE AND NEAR-EYE DISPLAY EQUIPMENT

(71) Applicant: Shenzhen Lochn Optics Hi-Tech Co., Ltd., Shenzhen (CN)

(72) Inventors: Hao Huang, Shenzhen (CN); Qiang Song, Shenzhen (CN); Xiaoming Guo, Shenzhen (CN); Xiaohui Zou, Shenzhen (CN); Hengshen Xu, Shenzhen (CN); Guobin Ma, Shenzhen (CN); Tao Wang, Shenzhen (CN)

(73) Assignee: SHENZHEN LOCHN OPTICS HI-TECH CO., LTD., Shenzhen (CN)

( * ) Notice: Subject to any disclaimer, the term of this patent is extended or adjusted under 35 U.S.C. 154(b) by 0 days.

(21) Appl. No.: 18/154,114

(22) Filed: Jan. 13, 2023

(65) Prior Publication Data

US 2023/0152596 A1      May 18, 2023

Related U.S. Application Data

(63) Continuation of application No. PCT/CN2021/080832, filed on Mar. 15, 2021.

(30) Foreign Application Priority Data

Jul. 14, 2020   (CN) .................. 202010672861.X

(51) Int. Cl.
    *G02B 27/01*           (2006.01)

(52) U.S. Cl.
    CPC ..... *G02B 27/0176* (2013.01); *G02B 27/0172* (2013.01); *G02B 2027/0123* (2013.01); *G02B 2027/0154* (2013.01)

(58) Field of Classification Search
    CPC ............ G02B 27/0176; G02B 27/0172; G03B 2027/0178; G03B 2027/0123; G03B 2027/0154
    See application file for complete search history.

(56) References Cited

FOREIGN PATENT DOCUMENTS

| CN | 109189215 A | 1/2019 |
|----|-------------|--------|
| CN | 109445096 A | 3/2019 |
| JP | 2019061079 A | 4/2019 |
| JP | 209086564 A | 7/2019 |

*Primary Examiner* — Thomas A Hollweg
*Assistant Examiner* — Mary A El-Shammaa
(74) *Attorney, Agent, or Firm* — IPro, PLLC

(57) ABSTRACT

Embodiments of this application relate to the technical field of optical design, and disclose a method for adjusting field of view angle applied to a waveguide plate in a near-eye display equipment, the waveguide plate forms a tilt angle relative to horizontal direction of human face, the method firstly acquires refractive index, bottom angle of the waveguide plate and a required field of view angle, then calculates the tilt angle of the waveguide plate according to the refractive index and bottom angle of the waveguide plate and the field of view angle, and finally, adjusts the tilt angle to make sure the near-eye display equipment with the field of view angle; the method disclosed by this application enables the waveguide plate to realize low refractive index and large field of view angle at the same time, and features better imaging, lower cost and better stability.

9 Claims, 8 Drawing Sheets

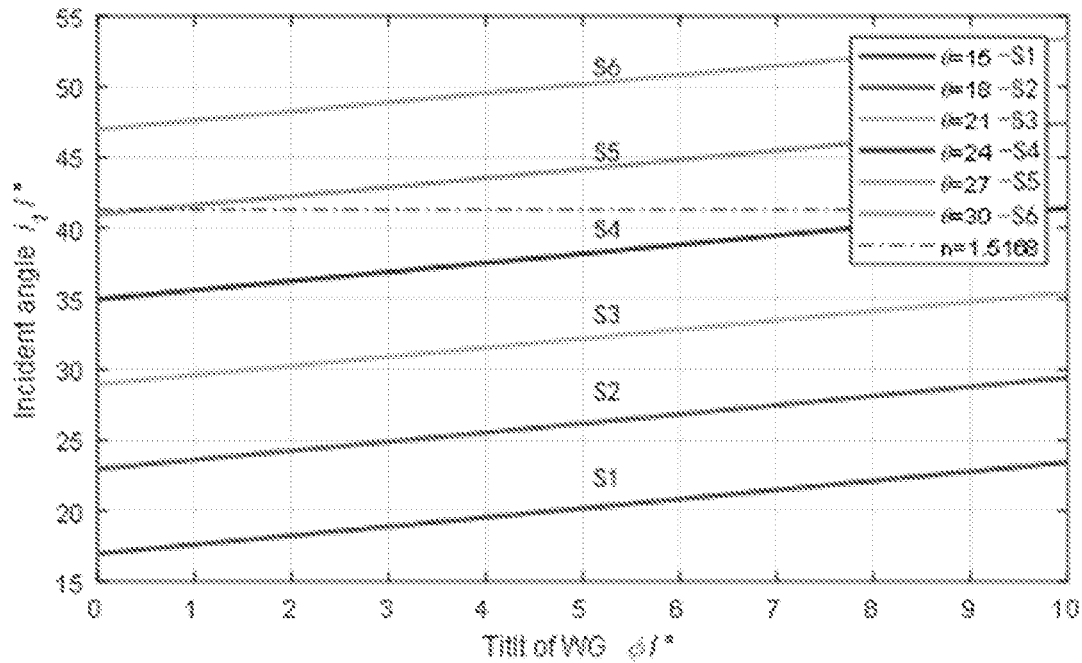

FIG.6

| Calculating an incident angle of the projection imaging light on the waveguide plate according to the refractive index and the bottom angle of the waveguide plate, the field of view angle and the tilt angle | 50 |

| Adjusting the orientation of the micro-display and the projection module to adjust the incident angle of the projection imaging light on the waveguide plate, so that the near-eye display equipment has the field of view angle | 60 |

FIG. 7

Calculating an incident angle of stray light on the waveguide plate according to the incident angle of the projection imaging light on the waveguide plate, and the refractive index and the bottom angle of the waveguide plate ~70

Calculating a lateral size of an eyebox of the near-eye display equipment according to a length of the waveguide plate, the tilt angle of the waveguide plate relative to the horizontal direction of the human face and the field of view angle of the near-eye display equipment ~80

Adjusting the bottom angle of the waveguide plate to adjust the exit angle of the stray light on the waveguide plate, so that the stray light deviates from the eyebox of the near-eye display equipment ~90

FIG. 8

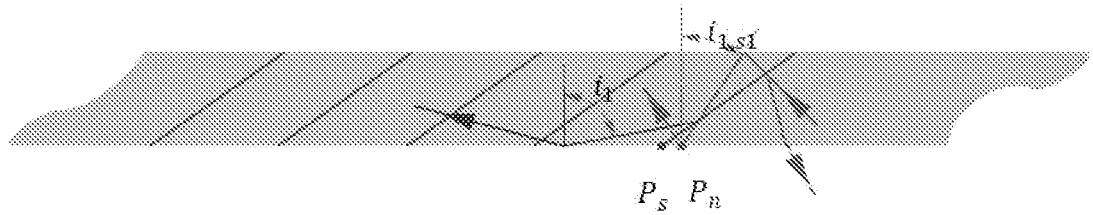

FIG. 9A

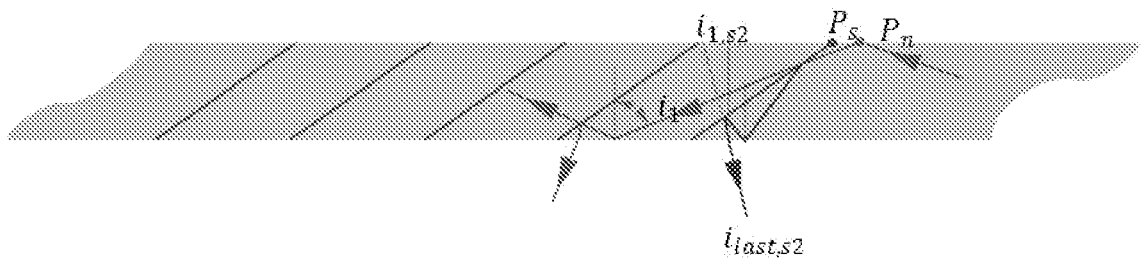

FIG. 9B

METHOD FOR ADJUSTING FIELD OF VIEW ANGLE AND NEAR-EYE DISPLAY EQUIPMENT

CROSS-REFERENCE TO RELATED APPLICATIONS

The present application claims priority to Chinese Patent Application No. 202010672861.X, filed with the Chinese Patent Office on Jul. 14, 2020, titled "METHOD FOR ADJUSTING FIELD OF VIEW ANGLE AND NEAR-EYE DISPLAY EQUIPMENT", the entire contents of which are incorporated herein by reference.

TECHNICAL FIELD OF THE INVENTION

Embodiments of the present application relate to the technical field of optical design, and in particular, relate to an adjusting method for field of view angle and a near-eye display equipment.

BACKGROUND OF THE INVENTION

Near-eye display is a hot research topic at present, such as virtual reality display of helmet forms and augmented reality display of smart glasses forms or the like. Near-eye display can provide people with an unprecedented sense of interaction, and has important application value in many fields such as telemedicine, industrial design, education, military virtual training, entertainment and so on. At present, in the field of near-eye display, an optical waveguide plate is usually adopted to transmit light; on the one hand, the optical waveguide can bring a better imaging effect, and on the other hand, it is beneficial to the miniaturization of near-eye display equipment.

In the process of implementing the embodiments of the present application, the applicant has found that there are at least the following problems in the above related technologies: the near-eye display equipments currently available on the market will be restricted by the refractive index of the waveguide plate material when the field of view angle of the equipment needs to be adjusted; when the field of view angle of the equipment needs to be increased, the waveguide plate in the near-eye display equipment needs to be replaced with a waveguide plate with a higher refractive index so as to achieve a larger field of view angle; however, the adoption of the waveguide plate with the higher refractive index often brings problems such as reduced imaging quality, increased cost and poor stability.

SUMMARY OF THE INVENTION

In a first aspect, an embodiment of the present application provides a method for field of view angle adjusting. The method is applied to a waveguide plate in a near-eye display equipment, and the waveguide plate forms a tilt angle relative to a horizontal direction of a human face. The method includes: acquiring a refractive index and a bottom angle of the waveguide plate; determining a required field of view angle; calculating the tilt angle of the waveguide plate relative to the horizontal direction of the human face according to the refractive index and the bottom angle of the waveguide plate, and the field of view angle; adjusting the tilt angle so that the near-eye display equipment has the field of view angle.

In some embodiments, the calculation formula for calculating the tilt angle of the waveguide plate relative to the horizontal direction of the human face is as follows:

$$\varphi = n \sin\left[\arcsin\left(\frac{1}{n}\right) - 2\theta\right] - y$$

wherein $\varphi$ represents the tilt angle of the waveguide plate relative to the horizontal direction of the human face, n represents the refractive index of the waveguide plate, $\theta$ represents the bottom angle of the waveguide plate, and y represents the field of view angle.

In some embodiments, the near-eye display equipment further includes a micro-display and a projection module for emitting projection imaging light, and the method further includes: calculating an incident angle of total internal reflection (TIR) transmission of the projection imaging light in the waveguide plate according to the refractive index and the bottom angle of the waveguide plate, the field of view angle and the tilt angle; adjusting the orientation of the micro-display and the projection module to adjust the incident angle of total internal reflection transmission of the projection imaging light in the waveguide plate, so that the near-eye display equipment has the field of view angle.

In some embodiments, the calculation formula for calculating the incident angle of total internal reflection transmission of the projection imaging light in the waveguide plate is as follows:

$$i_1 = 2\theta + \arcsin\left[\frac{\sin(y+\varphi)}{n}\right]$$

wherein $i_1$ represents the incident angle of total internal reflection transmission of the projection imaging light in the waveguide plate, $\theta$ represents the bottom angle of the waveguide plate, y represents the field of view angle, $\varphi$ represents the tilt angle of the waveguide plate relative to the horizontal direction of the human face, and n represents the refractive index of the waveguide plate.

In some embodiments, the method further includes: calculating an incident angle of stray light on the waveguide plate according to an incident angle of the projection imaging light entering the waveguide plate, and the refractive index and the bottom angle of the waveguide plate; calculating a lateral size of an eyebox of the near-eye display equipment according to a length of the waveguide plate, the tilt angle of the waveguide plate relative to the horizontal direction of the human face and the field of view angle of the near-eye display equipment; adjusting the bottom angle of the waveguide plate to adjust an exit angle of the stray light on the waveguide plate, so that the stray light deviates from the eyebox of the near-eye display equipment.

In some embodiments, the calculation formula for calculating the incident angle of the stray light on the waveguide plate is as follows:

$$i_{1,s2} = \pi - \left[6\theta + \arcsin\left(\frac{\sin i}{n}\right)\right]$$

wherein $i_{1,s2}$ represents the incident angle of the stray light on the waveguide plate, $\theta$ represents the bottom angle of the waveguide plate, i represents the incident angle of the projection imaging light entering the waveguide plate, and n represents the refractive index of the waveguide plate.

In some embodiments, the calculation formula for calculating the lateral size of the eyebox of the near-eye display equipment is as follows:

$$D=L_{wg}\times(\cos\varphi-2\tan y)$$

wherein D represents the lateral size of the eyebox of the near-eye display equipment, $L_{wg}$ represents the length of the waveguide plate, $\varphi$ represents the tilt angle of the waveguide plate relative to the horizontal direction of the human face, and y represents the field of view angle.

In a second aspect, an embodiment of the present application provides a near-eye display equipment. The near-eye display equipment includes: a waveguide plate, forming a tilt angle relative to a horizontal direction of a human face; a controller connected with the waveguide plate, the controller comprising at least one processor, and a memory communicatively connected with the at least one processor, wherein the memory stores instructions executable by the at least one processor, and the instructions are executed by the at least one processor to enable the at least one processor to execute the method for adjusting field of view angle as described above in the first aspect.

In some embodiments, the near-eye display equipment further includes a micro-display and a projection module for emitting projection imaging light, wherein the micro-display and the projection module are respectively connected with the controller, and the controller is configured to control and adjust the orientation of the micro-display and the projection module to adjust an incident angle of total internal reflection transmission of the projection imaging light in the waveguide plate.

In some embodiments, the near-eye display equipment further includes: a prism, through which the projection imaging light is refracted and incident on the waveguide plate; or a diffractive element, through which the projection imaging light is diffracted and incident on the waveguide plate.

In a third aspect, an embodiment of the present application further provides a computer-readable storage medium, which stores computer-executable instructions for causing a computer to execute the method as described above in the first aspect.

In a fourth aspect, an embodiment of the present application further provides a computer program product which includes a computer program stored on a computer-readable storage medium, and the computer program includes program instructions which, when executed by a computer, cause the computer to execute the method as described above in the first aspect.

BRIEF DESCRIPTION OF DRAWINGS

One or more embodiments are illustrated by pictures in corresponding attached drawings, and this does not constitute limitation on the embodiments. Elements/modules and steps with the same reference numerals in the attached drawings are shown as similar elements/modules and steps, and the pictures in the attached drawings do not constitute scale limitation unless otherwise stated particularly.

FIG. 6 is a diagram illustrating relationships between different bottom angles and different tilt angles of the waveguide plate and the incident angle of total internal reflection transmission of projection imaging light in the waveguide plate.

FIG. 7 is a schematic flowchart diagram of another method for adjusting field of view angle according to the first embodiment of the present application.

FIG. 8 is a schematic flowchart diagram of a method for avoiding stray light according to the first embodiment of the present application.

FIG. 9A is a schematic view illustrating the light path structure of stray light incident from one surface of the waveguide plate.

FIG. 9B is a schematic view illustrating the light path structure of stray light incident from the other surface of the waveguide plate.

DETAILED DESCRIPTION OF THE INVENTION

Figure 1:
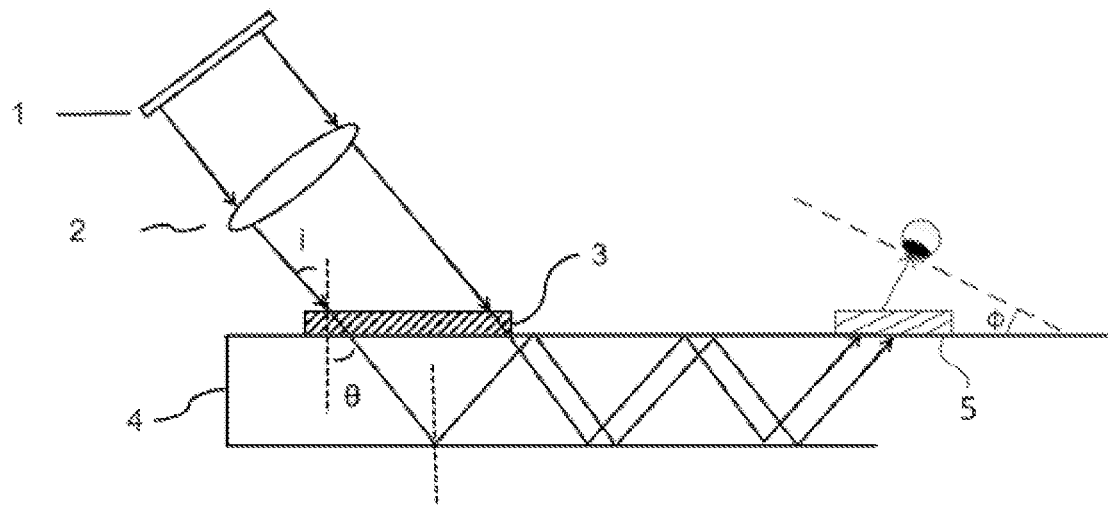
FIG. 1 is a schematic view of an application environment of a method for adjusting field of view angle according to an embodiment of the present application.

The present invention will be described in detail hereinafter with reference to specific embodiments. The following embodiments will facilitate the further understanding of the present invention by those skilled in the art, but are not intended to limit the present invention in any way. It shall be noted that, those of ordinary skill in the art can make several modifications and improvements without departing from the concept of the present invention. All these modifications and improvements belong to the scope claimed in the present invention.

In order to make objectives, technical solutions and advantages of the present application clearer, the present application will be further described in detail hereinafter with reference to attached drawings and embodiments. It shall be appreciated that, the specific embodiments described herein are only used to explain the present application, and are not used to limit the present application.

It shall be noted that, all features in the embodiments of the present application may be combined with each other without conflict, and all the combinations are within the scope claimed in the present application. In addition, although functional module division is made in the schematic diagrams of the device and logical sequences are shown in the flowchart diagrams, in some cases, the steps shown or described can be executed with module division and sequences different from those in the schematic diagrams of the device and the flowchart diagrams.

Unless otherwise defined, all technical and scientific terms used in this specification have the same meanings as commonly understood by those skilled in the art of the present invention. In this specification, the terms used in the specification of the present invention are only for the purpose of describing specific embodiments, and are not intended to limit the present invention. The term "and/or" used in this specification includes any and all combinations of one or more associated items listed.

In addition, the technical features involved in various embodiments of the present invention described below can be combined with each other as long as they do not conflict with each other.

Ordinary near-eye display equipment is usually restricted by the refractive index of waveguide plate material in the near-eye display equipments when it is required to realize a larger field of view angle. Usually, the increase of the field of view (FOV) angle of the existing waveguide plate can only be realized by increasing the bottom angle of the waveguide plate and/or increasing the refractive index of the waveguide plate. However, the former practice usually introduces stray light, which greatly reduces the imaging quality; in contrast, the latter practice has little impact on the imaging quality, but the use of the waveguide plate with high refractive index will bring more material problems and higher cost, such as dispersion of materials with high refractive index, change of film coating performance, refractive index matching degree of glue, adhesion, stability and other new problems.

In order to solve the above problems, an embodiment of the present application provides a method for adjusting field of view angle which is applied to a waveguide plate in a near-eye display equipment. The method adjusts the field of view angle of the equipment by adjusting the tilt angle of the waveguide plate relative to the horizontal direction of the human face, and preferably, the waveguide plate in the near-eye display equipment may be made of materials with low refractive index and more mature technology. The method according to the embodiment of the present application can realize large field of view angle and low refractive index of the waveguide plate in the near-eye display equipment at the same time so that the equipment has lower cost and better stability.

FIG. 1 is a schematic view of application environment of the method for adjusting field of view angle according to an embodiment of the present application, wherein the application environment is a near-eye display equipment, and the near-eye display equipment includes a micro-display 1, a projection module 2, a coupling-in grating 3, a waveguide plate 4 and a coupling-out grating 5, wherein the projection imaging light emitted by the micro-display 1 is collimated by the projection module 2 and then passes through the coupling-in grating 3, the light of the target diffraction order that is emitted after being diffracted by the coupling-in grating 3 is obliquely incident and coupled into the waveguide plate 4 at an incident angle i, and the optical fiber satisfying the total internal reflection condition propagates in the waveguide plate 4 without power loss until it encounters the coupling-out grating 5 and is again diffracted and coupled out to the human eye for imaging. The bottom angle of the waveguide plate 4 is θ. Optionally, the waveguide plate 4 forms a tilt angle φ relative to the horizontal direction of the human face.

Figure 2:
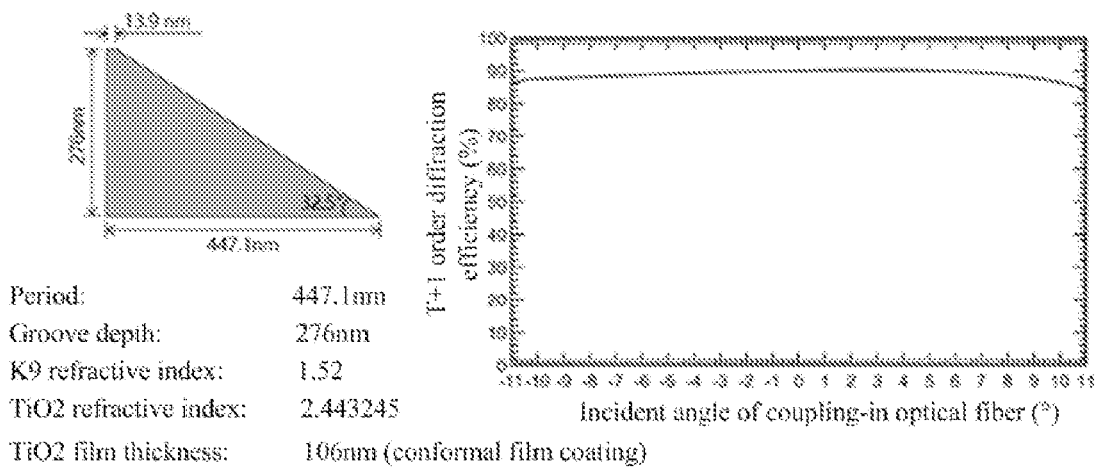
FIG. 2 is a schematic view of parameters of a micro-lens array.

In some embodiments, the coupling-in grating 3 may also be replaced by other diffractive elements, such as a micro-lens array or a super surface and other diffractive elements. When a micro-lens array is selected for use, referring to FIG. 2 together which shows a schematic view of parameters of a micro-lens array, a micro-lens array with a period of 447.1 nm, a groove depth of 276 nm, a K9 refractive index of 1.52, a TiO2 refractive index of 2.443245, and a TiO2 film thickness of 106 nm (conformal film coating) may be selected as the micro-lens array so as to achieve a diffraction efficiency of more than 85%.

Figure 3A:
FIG. 3A is a schematic view illustrating the light path structure of projection imaging light refracted and incident from one side of the optical waveguide.
Figure 3B:
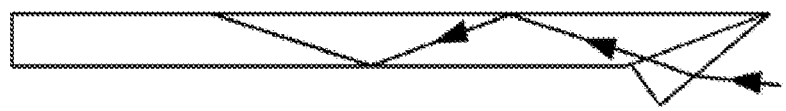
FIG. 3B is a schematic view illustrating the light path structure of projection imaging light refracted and incident from the other side of the optical waveguide.

In some embodiments, in addition to being diffracted and incident by diffractive elements described above, the projection imaging light may also be refracted and incident into the waveguide plate 4 by refractive elements such as prisms. Specifically, please refer to FIG. 3A and FIG. 3B together, which respectively show schematic views of light path structures of projection imaging light refracted and incident on the waveguide plate through prisms from both sides of the optical waveguide. Optionally, the projection imaging light may be incident at the oblique plane as shown in FIG. 1, FIG. 3A and FIG. 3B, or it may be incident vertically at the plane.

Specifically, the embodiments of the present application will be further explained below with reference to the attached drawings.

First Embodiment

Figure 4:
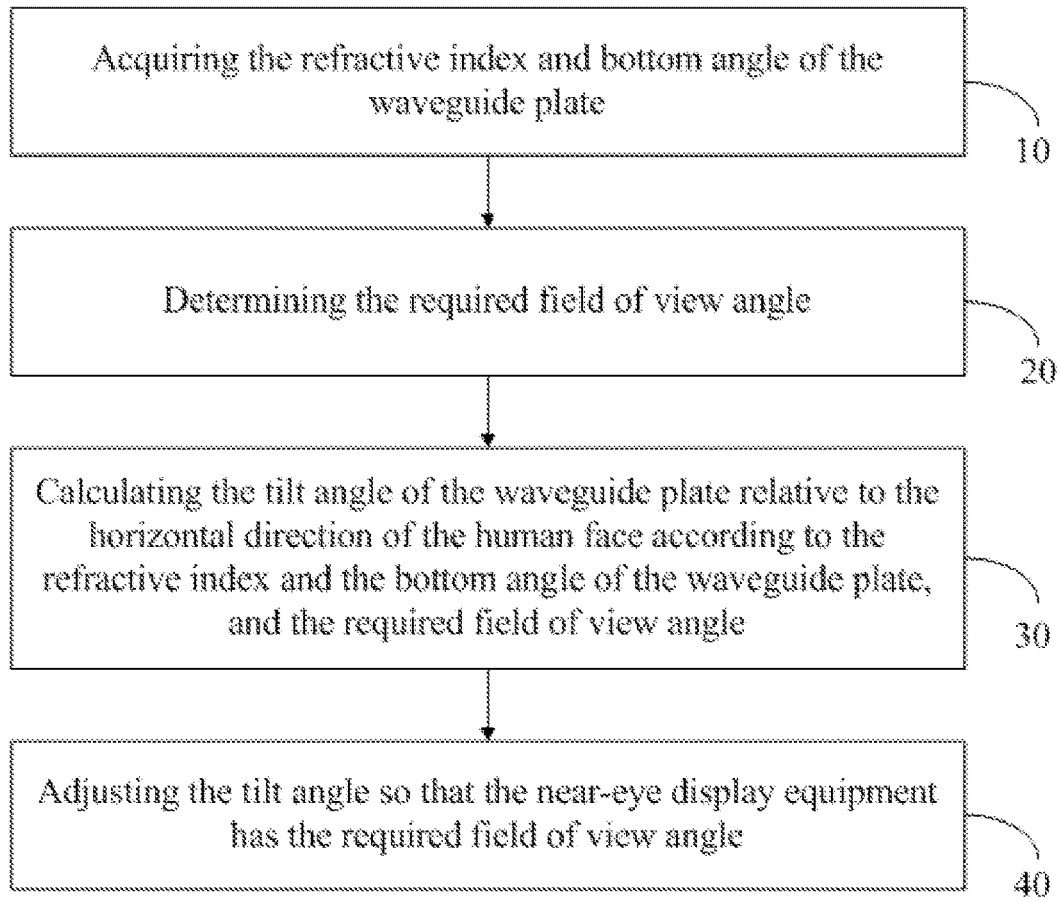
FIG. 4 is a schematic flowchart diagram of a method for adjusting field of view angle according to first embodiment of the present application.

This embodiment of the present application provides a method for adjusting field of view angle which is applied to a waveguide plate in a near-eye display equipment, the near-eye display equipment may be the near-eye display equipment described in the above application environment, and the waveguide plate forms a tilt angle φ relative to the horizontal direction of the human face. Referring to FIG. 4 together, which shows a flowchart diagram of the method for adjusting field of view angle according to the embodiment of the present application, the method for adjusting field of view angle includes but not limited to the following steps:

Step 10: acquiring the refractive index and bottom angle of the waveguide plate.

In the embodiment of the present application, the refractive index of the waveguide plate may be determined according to the model of the waveguide plate, and preferably, an optical waveguide plate made of materials with low refractive index is adopted to reduce the difficulty of obtaining raw materials and reduce the cost of processes and devices. The bottom angle of the waveguide plate may be confirmed according to relative positions of the waveguide plate and the projection component in the near-eye display equipment, and specifically, the bottom angle of the waveguide plate may be detected by an angle measuring instrument. Further speaking, in some embodiments, the field of view angle of the waveguide plate in the near-eye display equipment may also be adjusted in combination with adjusting the bottom angle of the waveguide plate.

Step 20: determining the required field of view angle.

In the embodiment of the present application, further speaking, in order to determine the adjustment direction and range of the waveguide plate, and confirm the field of view angle required by the user to use the near-eye display equipment, the required field of view angle may be a fixed value or a range, and specifically, it may be selected and determined according to actual needs.

Step 30: calculating the tilt angle of the waveguide plate relative to the horizontal direction of the human face, according to the refractive index and the bottom angle of the waveguide plate, and the field of view angle.

Preferably, in the embodiment of the present application, the tilt angle is not zero.

Figure 5:
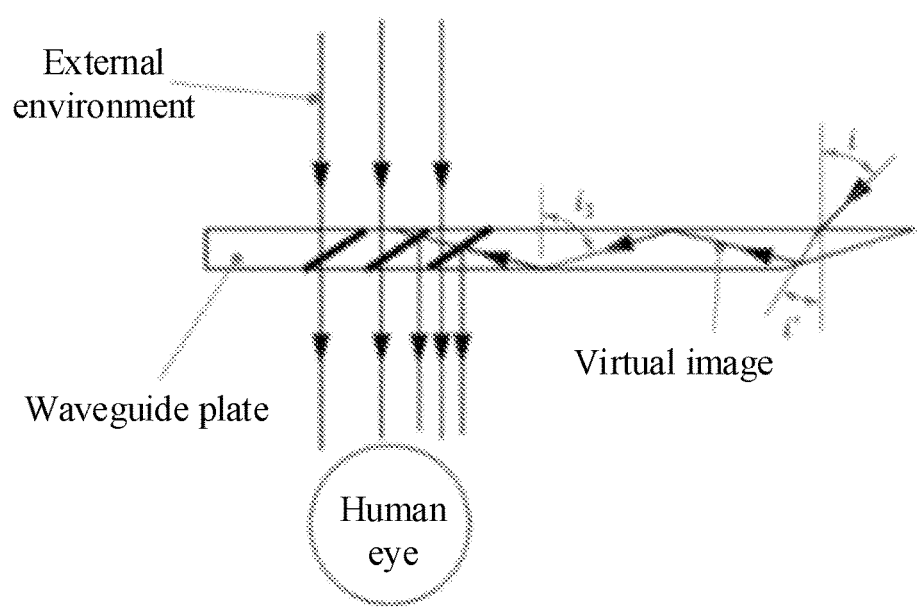
FIG. 5 is a schematic view illustrating the principle of propagation of light in the waveguide plate.

Please refer to FIG. 5 together, which shows the principle of propagation of light in the waveguide plate, in which the virtual image is the propagation light that the projection imaging light described in the above application environment totally internal reflects into the waveguide plate, and the background light of the external environment can be transmitted through the waveguide plate to the human eye, so that the user can synthesize an image in which the virtual image is superimposed on the external environment to realize augmented reality display (AR). In some embodiments, a reflective film may also be coated on a side of the waveguide plate that is far away from the human eye, so that the background light of the external environment cannot enter the human eye to realize virtual reality display (VR). The total internal reflection propagation of light in the optical waveguide satisfies the refraction law:

$$\sin i = n \cdot \sin i'$$

Wherein n represents the refractive index of the waveguide plate, i represents the incident angle of the projection imaging light entering the waveguide plate, i' represents the refraction and exit angle of light corresponding to the incident angle i of the projection imaging light entering the waveguide plate, and $i_1$ represents the incident angle of total internal reflection transmission of the projection imaging light in the waveguide plate (i.e., the virtual image in FIG. 5).

Moreover, when the projection imaging optical fiber is transmitted in the waveguide plate, the incident angles of the upper and lower main surfaces in the waveguide plate (that is, the incident angle of total internal reflection transmission of the projection optical fiber in the waveguide plate) need to be larger than the critical angle of total internal reflection. Based on the near-eye display equipment shown in FIG. 1, the total internal reflection transmission of the projection imaging light in the waveguide plate satisfies:

$$i_1 = 2\theta + i'$$

Wherein $i_1$ represents the incident angle of total internal reflection transmission of the projection imaging light in the waveguide plate, θ represents the bottom angle of the waveguide plate, and i' represents the refraction and exit angle of light corresponding to the incident angle i of the projection imaging light entering the waveguide plate.

Accordingly, by combining the above two formulas and the relationships between the field of view angle and the tilt angle, the calculation formula for calculating the tilt angle of the waveguide plate relative to the horizontal direction of the human face can be obtained as follows:

$$\varphi = n \, \sin\left[\arcsin\left(\frac{1}{n}\right) - 2\theta\right] - y$$

Wherein φ represents the tilt angle of the waveguide plate relative to the horizontal direction of the human face, n represents the refractive index of the waveguide plate, θ represents the bottom angle of the waveguide plate, and y represents the field of view angle.

Step 40: adjusting the tilt angle so that the near-eye display equipment has the required field of view angle.

Please refer to FIG. 6 together, which shows a diagram illustrating relationships between different bottom angles and different tilt angles of the waveguide plate and the incident angle of total internal reflection transmission of projection imaging light in the waveguide plate, in FIG. 6, the field of view angle y is set to be ±20°, the refractive index n of the waveguide plate is 1.5168, and five curves S1 to S5 respectively show the relationships between the tilt angle φ (abscissa) and the incident angle $i_1$ (ordinate) of total internal reflection transmission of the projection imaging light in the waveguide plate when the waveguide plate has five bottom angles from small to large. As shown in FIG. 6, increasing the tilt angle φ of the waveguide plate can significantly increase the incident angle $i_1$ of total internal reflection transmission of the projection imaging light in the waveguide plate, while reducing the bottom angle θ of the waveguide plate. Further speaking, similarly, for the waveguide plate made of H-K9L glass material, a bottom angle θ of more than 27° is required in order to obtain a field of view angle y of 40°, if the waveguide plate is not inclined.

In some embodiments, as shown in the above application scenario, the near-eye display equipment may further include a micro-display and a projection module for emitting projection imaging light; referring to FIG. 7 together and based on the method shown in FIG. 4 and the embodiment thereof, the method may further include the following steps:

Step 50: calculating an incident angle of total internal reflection transmission of the projection imaging light in the waveguide plate according to the refractive index and the bottom angle of the waveguide plate, the field of view angle and the tilt angle.

As can be known in combination with step 30, the propagation of the projection imaging light in the waveguide plate needs to meet the condition of total internal reflection, and the calculation formula for calculating the incident angle of total internal reflection transmission of the projection imaging light in the waveguide plate can be derived as follows from the formula in the above step 30:

$$i_1 = 2\theta + \arcsin\left[\frac{\sin(y+\varphi)}{n}\right]$$

Wherein $i_1$ represents the incident angle of total internal reflection transmission of the projection imaging light in the waveguide plate, θ represents the bottom angle of the waveguide plate, y represents the field of view angle, φ represents the tilt angle of the waveguide plate relative to the horizontal direction of the human face, and n represents the refractive index of the waveguide plate.

Step 60: adjusting the orientation of the micro-display and the projection module to adjust the incident angle of total internal reflection transmission of the projection imaging light in the waveguide plate, so that the near-eye display equipment has the required field of view angle.

As shown in the application environment and FIG. 1, by adjusting the orientation of the micro-display and the projection module, the incident angle i and the bottom angle θ of the projection imaging light incident into the waveguide plate can be adjusted, so that the exit angle i' of the projection imaging light in the waveguide plate can be adjusted, thereby adjusting the incident angle $i_1$ of total internal reflection transmission of the projection imaging light in the waveguide plate so that the near-eye display equipment has the required field of view angle y.

In some embodiments, in order to solve the problem of possible generation of stray light when the bottom angle of waveguide plate is too large under a large field of view angle, the embodiment of the present application further provides a method for avoiding stray light; referring to FIG. 8 together and based on the method shown in FIG. 4 and FIG. 7 and the embodiment thereof, the method may further include the following steps:

Step 70: calculating an incident angle of stray light on the waveguide plate according to the incident angle of the projection imaging light entering the waveguide plate, and the refractive index and the bottom angle of the waveguide plate.

Generally, the larger the incident angle is, the stronger the reflectivity will be, and stray light will be generated when large angle light is incident on a semi-transmitting and semi-reflective surface; and specifically, it may be divided into two cases where light is incident respectively from two surfaces of the waveguide plate. Please refer to FIG. 9A and FIG. 9B together, which show the two cases where stray light is incident respectively from two surfaces of the waveguide plate, wherein, in FIG. 9A, the projection imaging light is incident from the upper surface at an angle of $i_{1,s1}$, then intersects with the semi-reflective and semi-transmitting surface of the waveguide plate, and then reaches the lower surface at the intersection point $P_n$, the point $P_n$ is on the left side of a point $P_5$ at the boundary of the semi-reflective and semi-transmitting surface, and the stray light propagates in the waveguide plate at an angle of $i_1$; the light path shown in FIG. 9B is opposite to the light path shown in FIG. 9A, both FIG. 9A and FIG. 9B can produce a beam of stray light, the projection imaging light in FIG. 9A is the stray light in FIG. 9B, and the stray light in FIG. 9A is the projection imaging light in FIG. 9B. In FIG. 9B, the projection imaging light is incident from the lower surface and then reaches the upper surface of the waveguide plate at the intersection point of $P_n$, and the point $P_n$ is on the right side of the point $P_5$ at the boundary of the semi-reflective and semi-transmitting surface, and then the projection imaging light intersects with the semi-reflective and semi-transmitting surface, so the incident angle of the stray light on the lower surface in FIG. 9B satisfies:

$$i_{1,s2}=\pi-(6\theta+i')$$

Wherein $i_{1,s2}$ represents the incident angle of the stray light on the waveguide plate, $\theta$ represents the bottom angle of the waveguide plate, represents the refraction and exit angle of light corresponding to the incident angle i of the projection imaging light entering the waveguide plate, and as can be known based on the refraction law, the calculation formula for calculating the incident angle of the stray light on the waveguide plate is as follows:

$$i_{1,s2} = \pi - \left[6\theta + \arcsin\left(\frac{\sin i}{n}\right)\right]$$

Wherein $i_{1,s2}$ represents the incident angle of the stray light on the waveguide plate, $\theta$ represents the bottom angle of the waveguide plate, i represents the incident angle of the projection imaging light entering the waveguide plate, and i represents the refractive index of the waveguide plate.

Step 80: calculating a lateral size of an eyebox of the near-eye display equipment according to a length of the waveguide plate, the tilt angle of the waveguide plate relative to the horizontal direction of the human face and the field of view angle of the near-eye display equipment.

Figure 10:
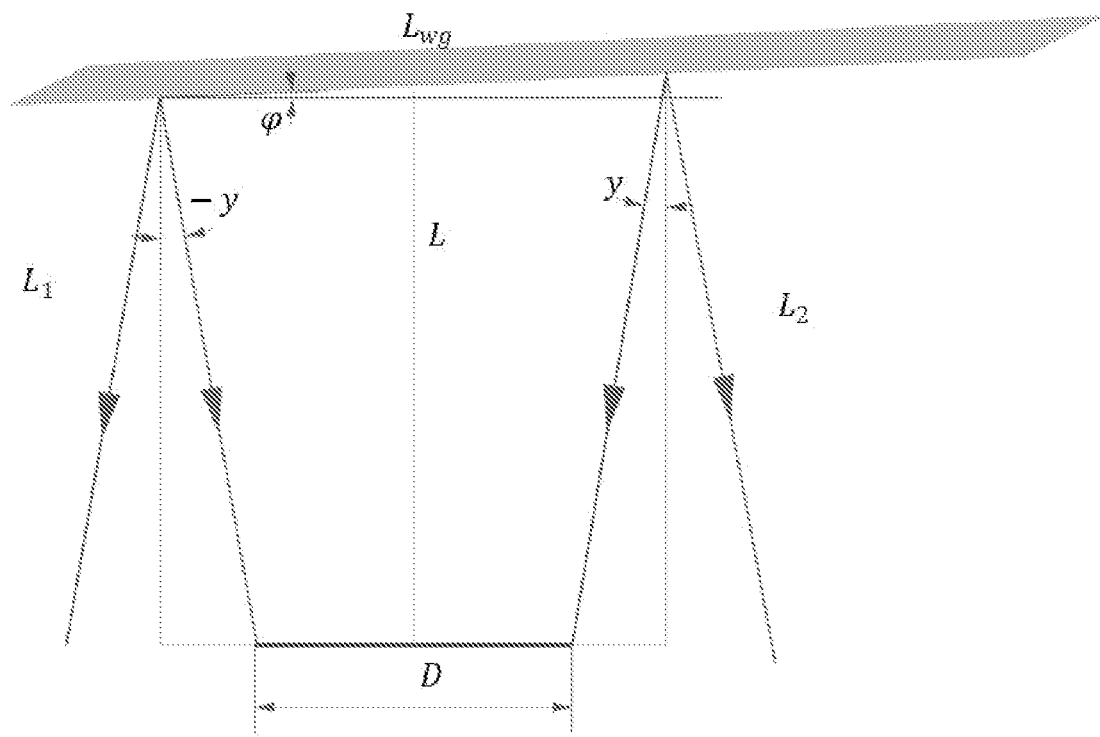
FIG. 10 is a schematic view illustrating the principle of the light path of exit pupil light emitted from the waveguide plate.

In the embodiment of the present application, in order to eliminate the influence of the stray light on imaging, preferably, it is only necessary to remove the stray light from the eyebox of the near-eye display equipment, and the eyebox is the area in the near-eye display equipment where the eyes can observe images and receive the projection imaging light. Please refer to FIG. 10 together, which shows the principle of light path of the exit pupil light emitted from the waveguide plate, wherein D is the lateral size of the eyebox of the near-eye display equipment, L is the distance from the via to the lower surface of the waveguide plate (i.e., the pupil distance), $L_1$ and $L_2$ are respectively distances from the projection imaging light emitted from two field of view angles of ±y to the exit pupil surface, $L_{wg}$ represents the length of the refractive surface of the waveguide plate, and $\varphi$ is the tilt angle of the waveguide plate relative to the horizontal direction of the human face. As can be known from FIG. 10, the above parameters satisfy the following relationships:

$$L_2+L_1=2*L_{wg}$$

$$L_{wg} \times \cos \varphi = D+(L_1+L_2)\times\tan y$$

The calculation formula for calculating the lateral size of the eyebox of the near-eye display equipment can be obtained as follows by combining the above two formulas:

$$D=L_{wg}\times(\cos \varphi-2 \tan y)$$

Wherein D represents the lateral size of the eyebox of the near-eye display equipment, $L_{wg}$ represents the length of the waveguide plate, $\varphi$ represents the tilt angle of the waveguide plate relative to the horizontal direction of the human face, and y represents the field of view angle. It can be concluded that to increase the size of the eyebox in the near-eye display equipment, it is necessary to increase the length of the waveguide plate correspondingly, and when the field of view angle y and tilt angle $\varphi$ are determined, the lateral size D of the eyebox is also inversely proportional to the pupil distance L. Please refer to FIG. 11 together, which shows a diagram illustrating the relationships between the lateral size D of the eyebox and the tilt angle $\varphi$ of the waveguide plate relative to the horizontal direction of the human face, in FIG. 11, the abscissa represents the tilt angle $\varphi$, the ordinate represents the lateral size D of the eyebox, the field of view angle y is 17.3°, the length $L_{wg}$ of the waveguide plate is 22.1 mm, and the pupil distance L is 22 mm; it can be concluded that when the field of view angle y, the pupil distance L and the length $L_{wg}$ of the waveguide plate are determined, the lateral size D of the eyebox is inversely proportional to the tilt angle $\varphi$ of the waveguide plate.

Step 90: adjusting the bottom angle of the waveguide plate to adjust an exit angle of the stray light on the waveguide plate, so that the stray light deviates from the eyebox of the near-eye display equipment.

Figure 11:
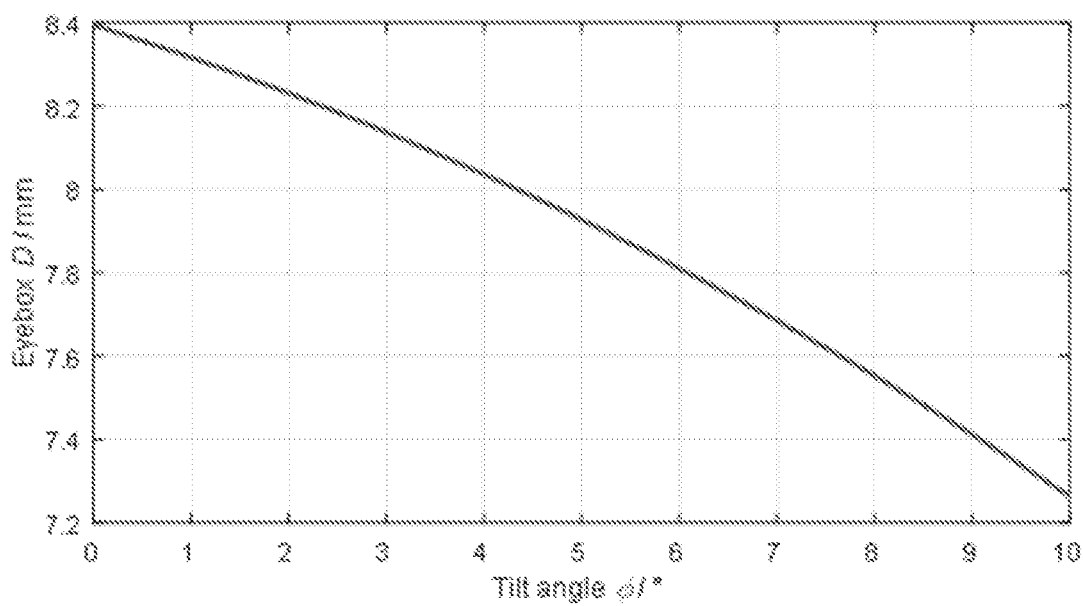
FIG. 11 is a diagram illustrating relationships between the tilt angle of the waveguide plate and the lateral size of an eyebox.
Figure 12:
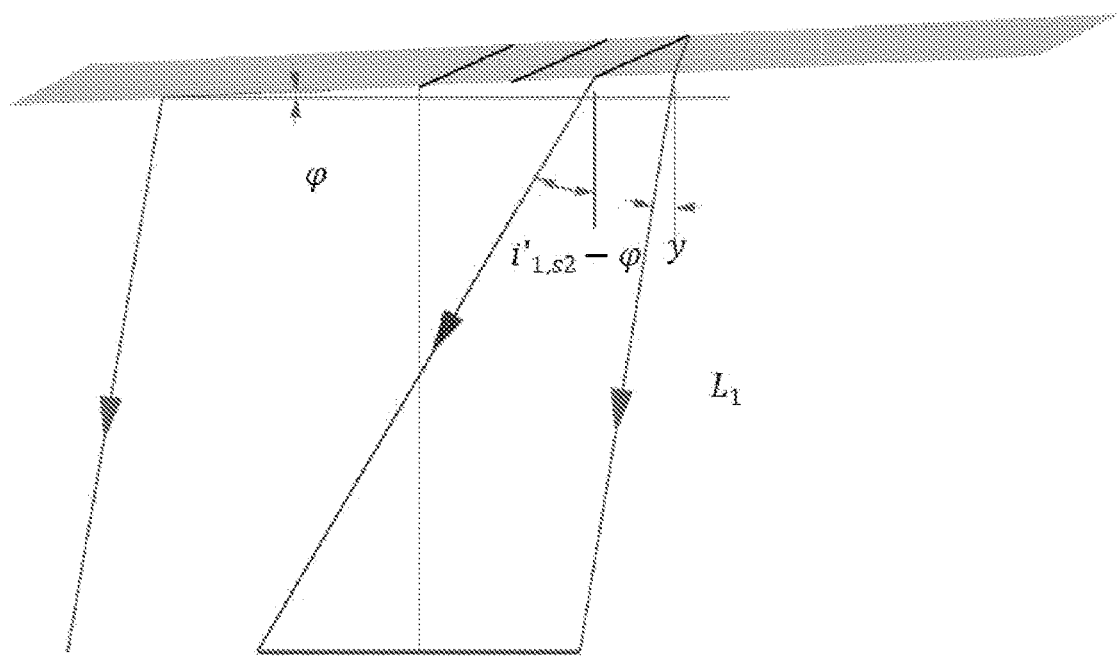
FIG. 12 is a schematic view illustrating the principle of eliminating stray light in the waveguide plate.

Based on FIG. 11 and referring to FIG. 12 together, which is a schematic view illustrating the principle of eliminating stray light, it is indicated that in order to eliminate the stray light and emit it out of the eyebox, the following relationship needs to be satisfied:

$$\tan(i'_{1,s2})\times L+d_1\times\cos \varphi > D+\tan(y)\times L_1$$

Wherein $i'_{1,s2}$ represents the exit angle of the stray light in the waveguide plate, L represents the pupil distance, $\varphi$ represents the tilt angle of the waveguide plate relative to the horizontal direction of the human face, D represents the lateral size of the eyebox of the near-eye display equipment, y represents the field of view angle, and $L_1$ is the distance from the projection imaging light emitted from the field of view angle y to the exit pupil surface. It can be concluded that in order to eliminate the stray light and make it deviate from the eyebox, the exit angle $i'_{1,s2}$ in the waveguide plate needs to be large enough, and it can be known from step 70 that the exit angle $i'_{1,s2}$ is related to the bottom angle θ of the waveguide plate; therefore, by adjusting the bottom angle θ, the exit angle $i'_{1,s2}$ of the stray light on the waveguide plate is adjusted, so that the stray light deviates from the eyebox of the near-eye display equipment.

Further speaking, the embodiment of the present application further provides two optimization methods for waveguide plates and two sets of optimization parameters for waveguide plates:

The first optimization method and the first set of optimization parameters:

In this optimized embodiment, referring to FIG. 1 and the embodiment shown in the application environment together, when the projection imaging light emitted by the microdisplay and the projection module is diffracted and incident on the waveguide plate through the coupling-in grating, the total internal reflection propagation of the optical fiber of the target diffraction order entering the waveguide plate in a slab waveguide needs to meet two conditions at the same time: 1) the diffraction angle needs to be larger than the total internal reflection angle of the optical waveguide; 2) the difference between the entrance pupil spacing of the optical waveguide and the human eye pupil should not be too large. Based on the above two conditions, reference may be made to the following two-dimensional grating equation for the parameter calculation of the optical waveguide provided in this embodiment:

$$\theta_{mn} = \arcsin\left[\frac{\sqrt{\left(\sin i\, \cos\phi + \frac{m\lambda}{d_x}\right)^2 + \left(\sin i\, \cos\phi + \frac{n\lambda}{d_y}\right)^2}}{n}\right]$$

$$\phi_{mn} = \arctan\left[\frac{\left(\sin i\, \sin\phi + \frac{n\lambda}{d_y}\right)}{\left(\sin i\, \cos\phi + \frac{m\lambda}{d_x}\right)}\right]$$

Wherein (m, n) is the diffraction order, $\theta_{mn}$ is the azimuth angle of the diffraction order (m, n), $\phi_{mn}$ is the polarization angle of which the diffraction order is (m, n), i is the incident polarization angle of the incident light of the coupling-in grating, ϕ is the azimuth angle of the incident light, n is the refractive index, $d_x$, $d_y$ are respectively the transverse period and longitudinal period of the two-dimensional grating, and Λ is the wavelength of the incident light.

In this optimized embodiment, the tilt direction of the projection imaging light is controlled to tilt in a one-dimensional direction (along the X direction), and a grating waveguide element with a tilt angle of 6° for the corresponding incident field light is designed according to the two conditions of the target diffraction order propagating in the slab waveguide and the two-dimensional grating equation. As shown in the following table:

| Tilt angle | 0° | 6° |
|---|---|---|
| H_FOV | 18° | 18° |
| V_FOV | 32° | 32° |
| h | 1 mm | 1 mm |
| λ | 525 nm | 525 nm |
| n | 1.7964 | 1.5659 |
| duty ratio | 50% | 50% |
| d | 454 nm | 454 nm |

Wherein H_FOV is the transverse field of view angle, V_FOV is the longitudinal field of view angle, h is the thickness of the slab waveguide/waveguide plate, Λ is the wavelength of the incident light, n is the refractive index of the slab waveguide, duty ratio is the grating duty ratio, and d is the grating period.

The second optimization method and the second set of optimization parameters:

In this optimized embodiment, the tilt angle φ and the bottom angle θ of the waveguide plate are further optimized; as can be known in combination with the above-mentioned embodiments, the bottom angle θ needs to be as small as possible in order to eliminate the stray light, while the bottom angle θ needs to be as large as possible in order to obtain a larger field of view angle. Please refer to the following table and FIG. 13 together, which show the maximum field of view angle of the waveguide plates under different refractive indices and different tilt angles when the bottom angle is determined (as 25°).

| | | Refractive index | | | | |
|---|---|---|---|---|---|---|
| Field of view angle | | 1.5 | 1.6 | 1.7 | 1.8 | 1.9 |
| Tilt angle | 0° | 12.34 | 18.30 | 24.23 | 30.25 | 36.50 |
| | 2° | 14.34 | 20.30 | 26.23 | 32.25 | 38.50 |
| | 4° | 16.34 | 22.30 | 28.23 | 34.25 | 40.50 |
| | 6° | 18.34 | 24.30 | 30.23 | 36.25 | 42.50 |
| | 8° | 20.34 | 26.30 | 32.23 | 38.25 | 44.50 |

Figure 13:
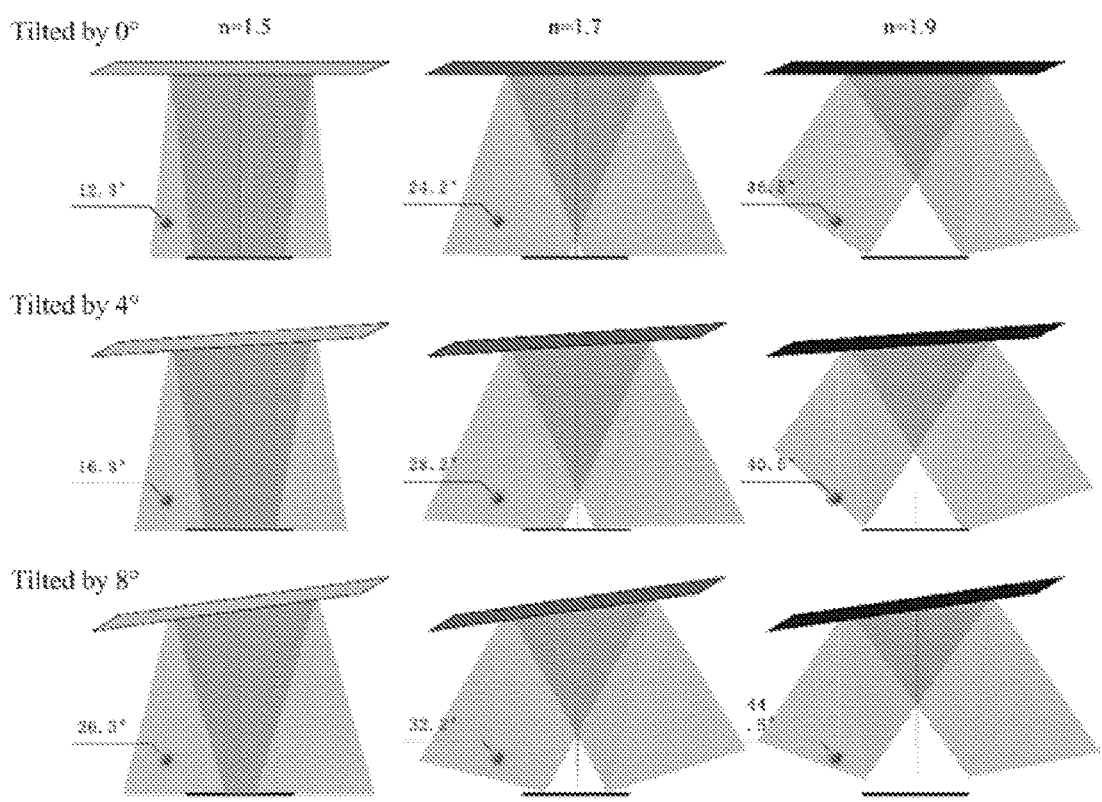
FIG. 13 is a schematic view illustrating the maximum field of view angle of a waveguide plate with a bottom angle of 25° under different refractive indices and different tilt angles.

FIG. 13 specifically plots a schematic view of the maximum field of view angle under three different tilt angles and three different refractive indices, in which the light ray diagrams of the left and right boundary fields are drawn; and as can be known from the above table and FIG. 13, if the waveguide plate is not tilted, then the refractive index needs to be increased to increase the field of view angle. For example, in the case where the waveguide plate is not tilted, when a field of view angle of about 30° needs to be designed, it can only be achieved by using a waveguide plate material with a refractive index of about 1.8. However, in the present application, the field of view angle of 30° can be achieved simply by tilting the waveguide plate between 4° and 8° and using the waveguide plate material with a refractive index of about 1.7. Preferably, after optimizing the data of the waveguide plate in the embodiment of the present application, a set of design parameters can be obtained to meet the light field imaging in large FOV and low refractive index, and other optical indices can be satisfied: the bottom angle θ is selected to be 27°, the tilt angle φ of the waveguide plate relative to the horizontal direction of the human face is selected to be 4°, the pupil distance L is selected to be 22 mm, the lateral size D of the eyebox of the near-eye display equipment is selected to be 8 mm, and the waveguide plate is made of H-K9L glass, so that a field of view angle y of 17.3° can be realized and the whole angle of the field of view angle is 40°

Second Embodiment

Figure 14:
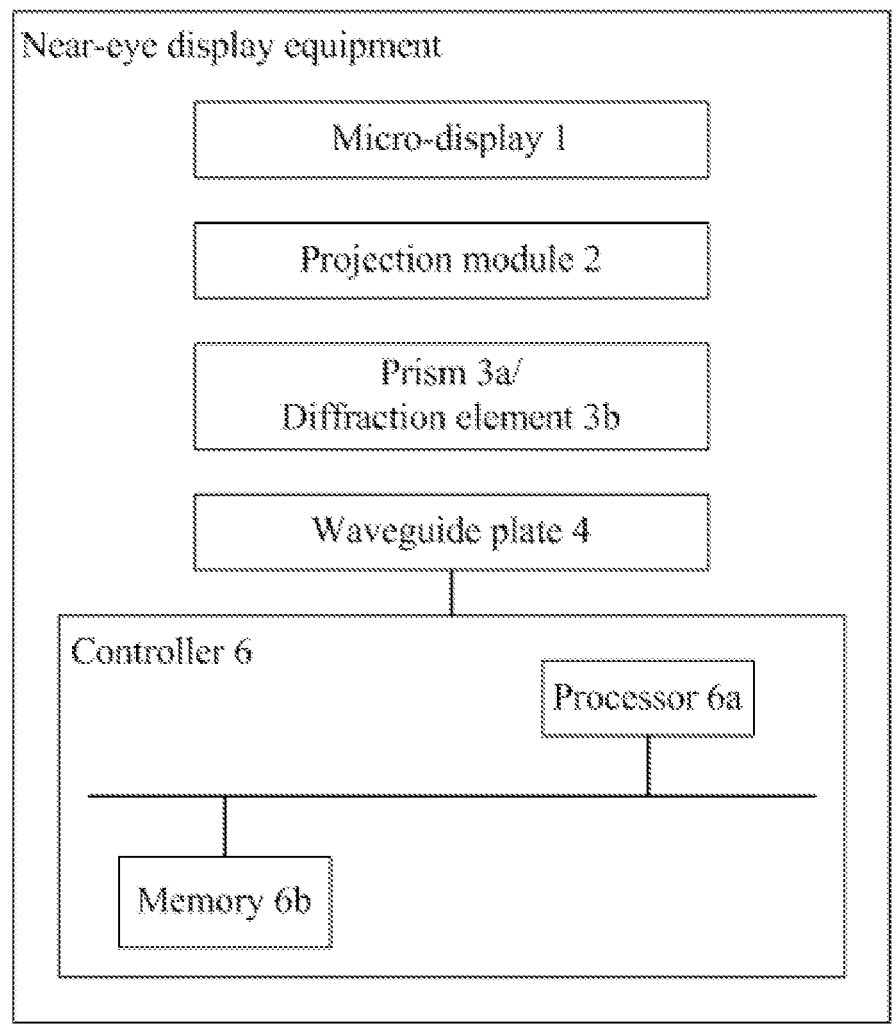
FIG. 14 is a schematic structural diagram of a near-eye display equipment according to second embodiment of the present application.

This embodiment of the present application provides a near-eye display equipment, referring to FIG. 14 together which shows a near-eye display equipment provided according to the embodiment of the present application, the near-eye display equipment includes a waveguide plate 4 and a controller 6, wherein the waveguide plate 4 forms a tilt angle relative to the horizontal direction of the human face, and the controller 6 is connected with the waveguide plate 4.

The near-eye display equipment further includes a micro-display 1 and a projection module 2 for emitting projection imaging light, wherein the micro-display 1 and the projection module 2 are respectively connected with the controller 6, and the controller 6 is configured to control and adjust the orientations of the micro-display 1 and the projection module 2, so as to adjust the incident angle of total internal reflection transmission of the projection imaging light in the waveguide plate 4.

The near-eye display equipment further includes: a prism 3a, through which the projection imaging light is refracted and incident on the waveguide plate 4; or a diffractive element 3b, through which the projection imaging light is diffracted and incident on the waveguide plate 4.

The near-eye display equipment may be the near-eye display equipment shown in the above application scenario and FIG. 1, and similarly, the micro-display 1, the projection module 2, the prism 3a/the diffractive element 3b, and the waveguide plate 4 may be the near-eye display equipment shown in the above application scenario and FIG. 1; reference may be made to the above embodiments for specific details, and this will not be further described herein.

The controller 6 includes at least one processor 6a; and a memory 6b communicatively connected to the at least one processor 6a, and one processor 6a is taken as an example in FIG. 14. The memory 6b stores instructions executable by the at least one processor 6a, and the instructions, when executed by the at least one processor 6a, enable the at least one processor 6a to execute the method for adjusting field of view angle described above in FIG. 4, FIG. 7 and FIG. 8. The processor 6a and the memory 6b may be connected by a bus or other means, and the bus connection is taken as an example in FIG. 14.

As a nonvolatile computer readable storage medium, the memory 6b may be used to store nonvolatile software programs, nonvolatile computer executable programs and modules, such as program instructions/modules corresponding to the method for adjusting field of view angle in the embodiments of the present application. The processor 6a executes various functional applications and data processing of the server, i.e., implement the method for adjusting field of view angle provided by the above embodiments of the method, by running the nonvolatile software programs, instructions and modules stored in the memory 6b.

The memory 6b may include a program storage area and a data storage area, wherein the program storage area may store operating systems and application programs required by at least one function; and the data storage area may store data created according to the use of the device for adjusting field of view angle or the like. In addition, the memory 6b may include a high-speed random access memory, and may also include a nonvolatile memory, such as at least one magnetic disk memory device, flash memory device, or other nonvolatile solid-state memory device. In some embodiments, the memory 6b optionally includes memories remotely provided relative to the processor 6a, and these remote memories may be connected to the device for adjusting field of view angle through a network. Examples of the above network include, but not limited to, the Internet, Intranet, local area networks, mobile communication networks and combinations thereof.

The one or more modules are stored in the memory 6b, and when executed by the one or more processors 6a, the one or more modules execute the method for adjusting field of view angle in any of the embodiments of the methods described above, e.g., execute the steps of the methods of FIG. 4, FIG. 7 and FIG. 8 described above.

The products described above may execute the method provided according to the embodiments of the present application, and have corresponding functional modules and beneficial effects for executing the method. For technical details not described in detail in this embodiment, reference may be made to the method provided according to the embodiments of the present application.

An embodiment of the present application further provides a nonvolatile computer readable storage medium storing computer executable instructions, and the computer executable instructions are executed by one or more processors to for example execute the steps of the methods of FIG. 4, FIG. 7 and FIG. 8 described above.

An embodiment of the present application further provides a computer program product, which includes a computer program stored on a nonvolatile computer readable storage medium, and the computer program includes program instructions which, when executed by a computer, enable the computer to execute the method for adjusting field of view angle in any of the embodiments of the methods described above, e.g., execute the steps of the methods of FIG. 4, FIG. 7 and FIG. 8 described above.

The embodiments of the present application provide a method for adjusting field of view angle which is applied to a waveguide plate in a near-eye display equipment, the waveguide plate forms a tilt angle relative to the horizontal direction of the human face, the method firstly acquires the refractive index and the bottom angle of the waveguide plate, then determines the required field of view angle, and then calculates the tilt angle of the waveguide plate relative to the horizontal direction of the human face according to the refractive index and the bottom angle of the waveguide plate and the field of view angle, and finally the tilt angle is adjusted so that the near-eye display equipment has the field of view angle; the method provided by the embodiment of the present application enables the waveguide plate to realize low refractive index and large field of view angle at the same time, and features better imaging, lower cost and better stability.

It shall be noted that, the embodiments of the devices described above are only for illustrative purpose, the units illustrated as separate components may be or may not be physically separated, and components displayed as units may be or may not be physical units; that is, these units and components may be located in one place or distributed over multiple network units. Some or all of the modules may be selected according to actual needs to achieve the purpose of the solution of this embodiment.

From the description of the above embodiments, those of ordinary skill in the art may clearly appreciate that each embodiment may be realized by means of software plus a general hardware platform, and of course, it may also be realized by hardware. As shall be appreciated by those of ordinary skill in the art, the implementation of all or part of the processes in the embodiments of the methods described above may be completed by instructing related hardware through a computer program, the program may be stored in a computer readable storage medium, and when it is executed, the program may include the processes of the embodiments of the methods described above. The storage medium may be a magnetic disk, an optical disk, a Read-Only Memory (ROM) or a Random Access Memory (RAM) or the like.

Finally, it shall be noted that, the above embodiments are only used to illustrate the technical solutions of the present invention, and are not intended to limit the present invention; under the idea of the present invention, technical features in the above embodiments or different embodiments may also be combined, the steps may be implemented in any order, and many other variations in different aspects of the present invention as described above are possible, and these variations are not provided in details for conciseness. Although the present invention has been described in detail with reference to the foregoing embodiments, those of ordinary skill in the art shall appreciate that, the technical solutions described in the foregoing embodiments may still be modified or some of the technical features may be equivalently replaced; and these modifications or replacements do not make the essence of the corresponding technical solutions deviate from the scope of the technical solutions of various embodiment of the present invention.

The invention claimed is:

1. A method for adjusting field of view angle, being applied to a waveguide plate in a near-eye display equipment, the waveguide plate forming a tilt angle relative to a horizontal direction of a human face, wherein the method comprises:
    acquiring a refractive index and a bottom angle of the waveguide plate;
    determining a required field of view angle;
    calculating the tilt angle of the waveguide plate relative to the horizontal direction of the human face according to the refractive index and the bottom angle of the waveguide plate, and the field of view angle;
    adjusting the tilt angle so that the near-eye display equipment has the field of view angle;
    wherein the calculation formula for calculating the tilt angle of the waveguide plate relative to the horizontal direction of the human face is as follows:

$$\varphi = n \, \sin\left[\arcsin\left(\frac{1}{n}\right) - 2\theta\right] - y$$

wherein $\varphi$ represents the tilt angle of the waveguide plate relative to the horizontal direction of the human face, n represents the refractive index of the waveguide plate, $\theta$ represents the bottom angle of the waveguide plate, and y represents the field of view angle.

2. The method according to claim 1, wherein the near-eye display equipment further comprises a micro-display and a projection module for emitting projection imaging light, and the method further comprises:
    calculating an incident angle of total internal reflection transmission of the projection imaging light in the waveguide plate according to the refractive index and the bottom angle of the waveguide plate, the field of view angle and the tilt angle;
    adjusting the orientation of the micro-display and the projection module to adjust the incident angle of total internal reflection transmission of the projection imaging light in the waveguide plate, so that the near-eye display equipment has the field of view angle.

3. The method according to claim 2, wherein the calculation formula for calculating the incident angle of total internal reflection transmission of the projection imaging light in the waveguide plate is as follows:

$$i_1 = 2\theta + \arcsin\left[\frac{\sin(y+\varphi)}{n}\right]$$

wherein $i_1$ represents the incident angle of total internal reflection transmission of the projection imaging light in the waveguide plate, $\theta$ represents the bottom angle of the waveguide plate, y represents the field of view angle, $\varphi$ represents the tilt angle of the waveguide plate relative to the horizontal direction of the human face, and n represents the refractive index of the waveguide plate.

4. The method according to claim 2, wherein the method further comprises:
    calculating an incident angle of stray light on the waveguide plate according to an incident angle of the projection imaging light entering the waveguide plate, and the refractive index and the bottom angle of the waveguide plate;
    calculating a lateral size of an eyebox of the near-eye display equipment according to a length of the waveguide plate, the tilt angle of the waveguide plate relative to the horizontal direction of the human face and the field of view angle of the near-eye display equipment;
    adjusting the bottom angle of the waveguide plate to adjust an exit angle of the stray light on the waveguide plate, so that the stray light deviates from the eyebox of the near-eye display equipment.

5. The method according to claim 4, wherein the calculation formula for calculating the incident angle of the stray light on the waveguide plate is as follows:

$$i_{1,s2} = \pi - \left[6\theta + \arcsin\left(\frac{\sin i}{n}\right)\right]$$

wherein $i_{1,s2}$ represents the incident angle of the stray light on the waveguide plate, $\theta$ represents the bottom angle of the waveguide plate, i represents the incident angle of the projection imaging light entering the waveguide plate, and n represents the refractive index of the waveguide plate.

6. The method according to claim 4, wherein the calculation formula for calculating the lateral size of the eyebox of the near-eye display equipment is as follows:

$$D = L_{wg} \times (\cos \varphi - 2 \tan y)$$

wherein D represents the lateral size of the eyebox of the near-eye display equipment, $L_{wg}$ represents the length of the waveguide plate, $\varphi$ represents the tilt angle of the waveguide plate relative to the horizontal direction of the human face, and y represents the field of view angle.

7. A near-eye display equipment, comprising:
    a waveguide plate, forming a tilt angle relative to a horizontal direction of a human face;
    a controller connected with the waveguide plate, the controller comprising at least one processor, and a memory communicatively connected with the at least one processor, wherein the memory stores instructions executable by the at least one processor, and the instructions are executed by the at least one processor to enable the at least one processor to execute the method for field of view angle adjusting according to claim 1.

8. The near-eye display equipment according to claim 7, wherein the near-eye display equipment further comprises a micro-display and a projection module for emitting projection imaging light wherein the micro-display and the projection module are respectively connected with the controller, and the controller is configured to control and adjust the orientation of the micro-display and the projection module so as to adjust an incident angle of total internal reflection transmission of the projection imaging light in the waveguide plate.

9. The near-eye display equipment according to claim 8, wherein the near-eye display equipment further comprises:
- a prism, through which the projection imaging light is refracted and incident on the waveguide plate; or
- a diffractive element, through which the projection imaging light is diffracted and incident on the waveguide plate.

* * * * *